Figure 2:
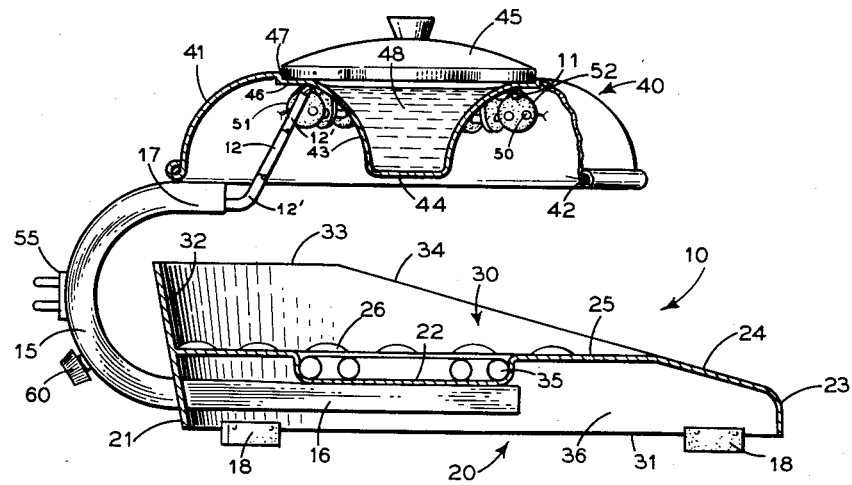

Dec. 19, 1961  W. MERKLEIN  3,014,114
BROILERS
Filed July 15, 1959

INVENTOR
William Merklein
deceased,
by Norah Merklein,
Administratrix

BY *Irving Seidman*
ATTORNEY

United States Patent Office 3,014,114
Patented Dec. 19, 1961

3,014,114
BROILERS
William Merklein, deceased, late of 220 6th Ave., Brooklyn, N.Y., by Norah Merklein, administratrix, Brooklyn, N.Y., assignor of sixty percent to Isser J. Bobrove, New York, N.Y.
Filed July 15, 1959, Ser. No. 827,281
3 Claims. (Cl. 219—34)

This invention relates to electric appliances and, more particularly, to a reflector type electric broiler having novel constructional features and adapted for use either as a broiler or as a boiler, and wherein the broiling and boiling functions can be performed simultaneously without mutual interference.

Of recent years, electric cooking appliances have found ever-increasing acceptance, one of the most popular types being the portable electric oven or broiler, and other types including the electric hot plate having one or more surface units upon which utensils, such as pots or pans can be heated. One of the objectionable features of the electric broilers in the tendency of grease to form hardened encrustations adhering to the reflective surfaces, lowering the heat reflecting efficiency and necessitating frequent cleaning. A more general objection has been the very specialized nature of the appliances, requiring a different type of appliance for each type of cooking operation such as broiling and boiling, for example.

In accordance with the present invention, a novel combined broiling and boiling electric appliance is provided in which grease or other fumes, resulting from broiling, for example, will not adhere as hard encrustations to the reflective surface. In addition, the appliance is constituted by a novel combination of heating elements, heat reflecting and concentrating surfaces, and heat confining and conserving surfaces.

More particularly, the novel combined function appliance or unit includes a substantially flat metal base, having a heating unit associated therewith, an upwardly extending wall or rim enclosing a substantial peripheral portion of the base, a rigid support arm secured to the base and hollow to receive electrical conductors, a heating unit on the upper end of said arm, and an annular parabolic section reflector fitting over the upper heating unit and focusing and directing its radiant energy toward the base.

This reflector has a highly polished reflecting surface and includes a relatively deep central bowl arranged to receive a cover. In operation of the unit, water in this bowl cools the reflector sufficiently to prevent hot grease or fat encrusting thereon, and the water may be used for boiling food in addition to its function as a coolant. A suitable male or female connector is incorporated in the support arm for connection of the unit, by means of an appliance cord, to a convenience outlet, and a control switch is provided to control and apportion the heat provided by the base and upper heating units.

Figure 1:
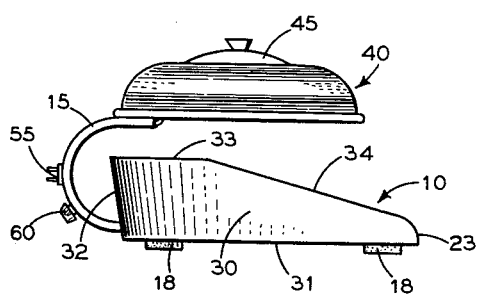
Figure 3:
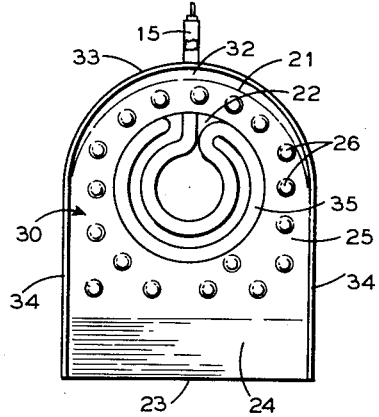
Figure 4:
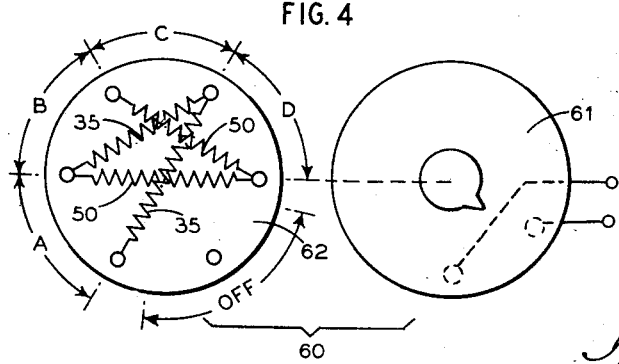

For an understanding of the invention principles, reference is made to the following description of a typical embodiment thereof as illustrated in the accompanying drawing. In the drawing:

FIG. 1 is a side elevation view of the unit;
FIG. 2 is a vertical sectional view thereof;
FIG. 3 is a plan view of the base of the unit; and
FIG. 4 is a schematic wiring diagram of the control switch and heating units.

Referring to the drawings, the combination broiler and boiler 10 comprises a base 20 from which extends a tubular arm 15 supporting the upper heating unit on which a reflector and boiler unit 30 is supported.

Base 20 comprises a metal plate, or support surface 25 which, in plan, has one circular end 21 concentric with a relatively large circular depression 22 in its upper surface, and is extended at its other end to a substantially rectilinear edge 23. In effect, the base had, in plan, substantially shovel shape. Plate 25 is substantially horizontal over the major part of its length, in the normal operating position of appliance 10, but slopes downwardly, as at 24, adjacent edge 23.

Plate 25 is supported in an upwardly extending metal wall 30 which, except along the side edges of ramp 24 and along edge 23, extends both above and below plate 25 and has a substantially horizontal lower edge 31. Wall 30 is brazed, welded, or otherwise integral with plate 25. The portion 32 of wall 30 extending along the circular end 21 of plate 25 has a maximum extent above the plate and its upper edge 33 is parallel to lower edge 31. Also, this portion of wall 30 flares outwardly in the direction of its upper edge.

The remainder of the portion of wall 30 above plate 25 has sloping upper edges 34 which merge flush with ramp 24 of plate 25. The wall 30, in conjunction with ramp 24, thus facilitates placing of a cooking vessel on plate 25 and centering of the vessel over depression 22. To further facilitate movement of a vessel into position, the upper surface of plate 25 has protuberances or buttons 26 surrounding depression 22 and extending to ramp 24. At least the inner surface of wall 30 is of highly reflective material, such as polished stainless steel, to concentrate and retain radiant heat.

A resistance heating coil 35 in suitably mounted centrally of depression 22 and is supplied with current by conductors extending through tubular arm 15. This arm, which is preferably of square tubular cross section, has a straight lower end 16 extending through an opening in the lower skirt 36 of wall 30 below plate 25, and arm 16 is suitably integrally secured to the bottom wall of depression 22. Outwardly of skirt 36, arm 15 curves upwardly and inwardly in a substantially circular curve. The open upper end 17 of arm 15 is substantially within the vertical zone defined by wall 30 and particularly part 32 of wall 30. Support posts or legs 18 are fixed on the lower edge of skirt 36.

A relatively heavy and stiff rod 11 is bent into a circular form and has ends 12, 12' bent down in juxtaposed relation and integrally secured within the open upper end 17 of arm 15. Rod 11 supports the upper heating unit 50 and, for this purpose, the dielectric spacer disks 51 of unit 50 are secured to the circular part of rod 11 by wires 52. Other means of securing disks 51 to rod 11 may be used, such as running rod 11 through holes in disk 51. However, the described arrangement is advantageous from the standpoint of replacement of unit 50.

An important feature of the invention is the radiant heat reflecting cover and boiler 40 which is removably seated on rod 11. The heat reflecting portion of this cover 40, which portion is substantially centered on unit 50, is an annulus of downwardly opening substantially parabolic cross-section. The outer essentially parabolic wall 41 has its lower edge curled over a reinforcing rod 42. The inner essentially parabolic wall 43 has its lower edge integral with a flat circular wall 44.

Walls 43 and 44 conjointly form a receptacle for liquid, such as water, and thus constitute a boiling section heated by unit 50. As will be noted from FIG. 2, the upper end of wall 43 is flattened into a horizontal plane, as at 46, forming a shoulder 47 at its juncture with wall 41. Flat surface 46 and shoulder 47 form a seat for a cover or lid 45.

As indicated at 48, water is maintained in the boiler section at all times. Due to the water absorbing heat from the reflector, there is no incrustation of fat or grease on the highly polished stainless steel inner surface of reflector 40. This reflector may be entirely stainless steel or may be bi-metal with a polished stainless steel inner surface.

Electric current is supplied to unit 10 by a suitable appliance cord having a socket engageable with a plug 55 mounted in arm 15, and control of the relative heating effect of the lower and upper units 35 and 50 is provided by a selector switch 60 also mounted on handle 15. If desired, the connector 55 can be a female receptacle rather than a male plug.

As best seen in FIG. 4, switch 60 includes a circuit closer 61 rotatable relative to a contact carrying base 62 to which lower unit 35 and upper unit 50 are connected. Switch 60 has an "Off" position and four (4) "On" positions labeled A, B, C and D. In position A, all heat is supplied by the two legs of lower unit 35. In the B position all heat is supplied by the two legs of upper unit 50. In the C position, the heat is supplied by the two legs of unit 50 in series with one-half of unit 35, so that unit 50 supplies ⅔ the heat. In the D position, the heat is supplied by one leg of each unit connected in series, thus dividing the heat between the upper and lower units.

While a specific embodiment of the invention has been shown and described in detail to illustrate the application of the invention principles, it will be understood that the invention may be embodied otherwise without departing from such principles.

What is claimed is:

1. Electric cooking apparatus comprising, in combination, a base; a first electric heating unit in said base; a support arm extending upwardly from said base, then inwardly and then upwardly; a second electric heating unit supported from said arm in upwardly spaced substantially parallel relation to said base; an inverted trough shape annular reflector supported above said second unit and reflecting the heat therefrom toward said base; an appliance cord connector on said arm; and a multi-position switch selectively controlling application of potential applied through said connector to each of said units; said reflector embracing the upper end of said arm and said second heating unit.

2. Electric cooking apparatus as claimed in claim 1 in which the center of said reflector forms a readily accessible heating basin for boiling liquids, whereby said apparatus may be used to boil foods either simultaneously or alternatively with heating foods in a container supported on said base.

3. Electric cooking apparatus as claimed in claim 1 in which said base has a semi-oval shape section which merges with a rectangular section having a ramp for easy movement of utensils onto said base and a rim extending above said base and including a section of uniform height bounding said semi-oval shape section and extending above and below said base, and sections of decreasing height along the sides of said rectangular section and ramp and having rectilinear upper edges merging with the upper surface of said ramp.

References Cited in the file of this patent

UNITED STATES PATENTS

| | | |
|---|---|---|
| 1,231,196 | Rankin et al. | June 26, 1917 |
| 2,042,855 | Merklein | June 2, 1936 |
| 2,057,421 | Dickson | Oct. 13, 1936 |
| 2,198,645 | Wolcott | Apr. 30, 1940 |
| 2,230,260 | Owen et al. | Feb. 4, 1941 |
| 2,863,979 | Fitzgerald | Dec. 9, 1958 |

FOREIGN PATENTS

| | | |
|---|---|---|
| 484,199 | Great Britain | Apr. 28, 1938 |